(No Model.)

J. J. DUGAN.
SPRAYING DEVICE.

No. 503,455. Patented Aug. 15, 1893.

WITNESSES:
J. A. Bergstrom
C. Sedgwick

INVENTOR
J. J. Dugan
BY
ATTORNEYS.

UNITED STATES PATENT OFFICE.

JOHN J. DUGAN, OF SALEM, OREGON.

SPRAYING DEVICE.

SPECIFICATION forming part of Letters Patent No. 503,455, dated August 15, 1893.

Application filed March 23, 1893. Serial No. 467,320. (No model.)

*To all whom it may concern:*

Be it known that I, JOHN J. DUGAN, of Salem, in the county of Marion and State of Oregon, have invented a new and Improved Spraying Device, of which the following is a full, clear, and exact description.

My invention relates to improvements in that class of spraying devices which is operated by hand and which is used for spraying plants and similar things; and the object of my invention is to produce a simple device which may be provided with any well known form of spraying nozzle or nozzles, and which will by gravity assume a position to direct the sprays upward so that the water may be directed to the under sides of the leaves of plants. The device therefore is peculiarly adapted for sprinkling solutions adapted to kill insects on the plants.

To this end my invention consists in certain features of construction and combinations of parts, as will be hereinafter described and claimed.

Reference is to be had to the accompanying drawings forming a part of this specification, in which similar figures of reference indicate corresponding parts in all the views.

Figure 1:
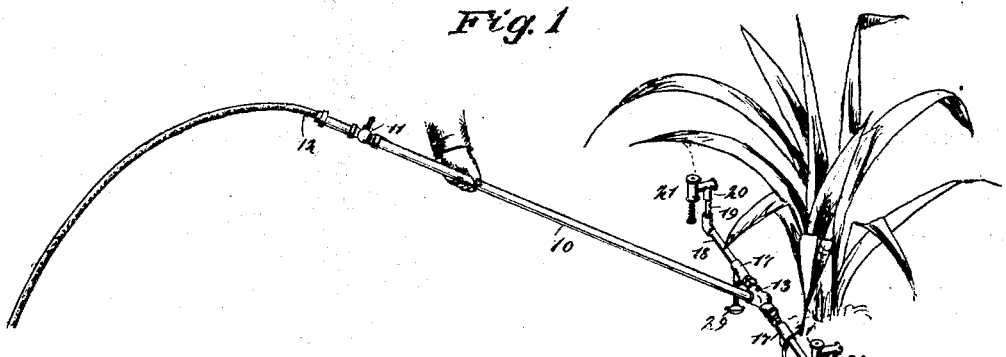
Figure 2:
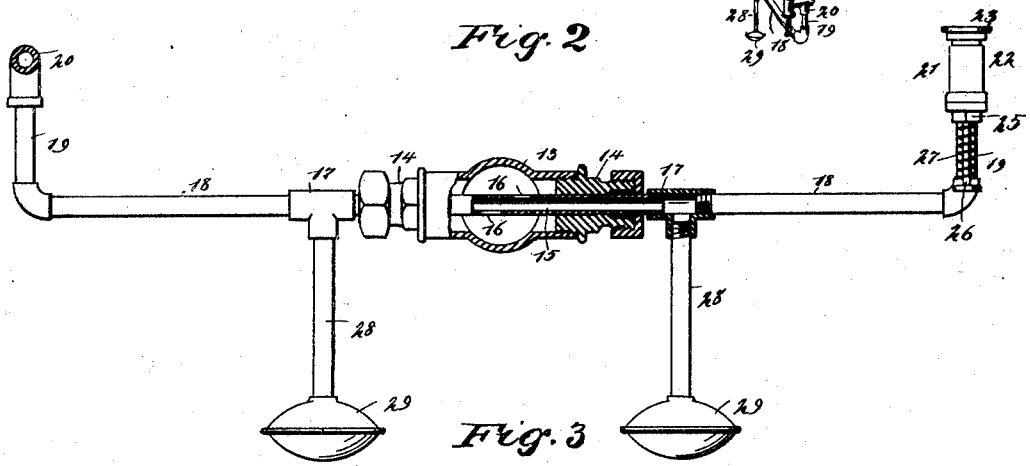
Figure 3:
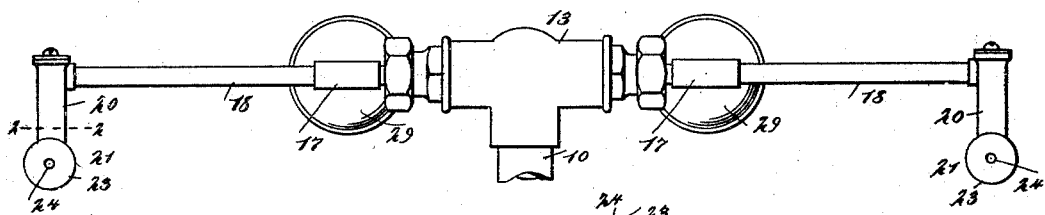

Figure 1 is a perspective view of the apparatus showing also the manner in which it is used. Fig. 2 is an enlarged broken detail view, partly in section on the line 2—2 in Fig. 3, and with one of the stuffing boxes in section. Fig. 3 is a broken plan view of the device; and Fig. 4 is a broken elevation, partly in section, of a modified form of the device which has but a single nozzle.

The device is provided with a supply pipe 10 which serves as a handle and which has, at one end, a stop cock 11 near which it couples with a hose 12. The other end of the pipe 10 connects with a T-coupling 13, the opposite ends of which are provided with stuffing boxes 14, and a pipe 15 runs through the T and through the two stuffing boxes, being held to turn therein, this pipe having holes 16 through it to enable the water to flow freely into it from the T. To the ends of the pipe 15 are secured couplings 17, and by means of these couplings outwardly extending pipes 18, which, at their outer ends, extend upward, as shown at 19 and connect by means of elbows 20 with the spraying nozzles 21. These nozzles may be of any usual kind, and may be connected with the pipes 18 in any convenient manner, but as illustrated, each nozzle comprises a shell or cylinder 22, a screw cap 23 on one end of the shell, the cap having a hole 24 for the exhaust of water, a plug 25 in the opposite end of the shell, and an elongated valve 26 which slides through the plug and is adapted to close, or partially close, the hole 24, and a spring 27 which normally holds the valve open.

To the under side of the couplings 17 are secured rods 28, which, at their lower ends, terminate in weights 29, but the weights may be attached to the water pipes 18 in any other convenient way, without departing from the principle of my invention. The weights 29 hang normally downward so as to bring the rods 28 into a vertical position, and the spraying nozzles are arranged in relation to the weight rods, so that they will also assume a vertical position, the weights and rods serving to turn the pipes 18, and it follows that the nozzles 21 will always be in a position to deliver upward without regard to the handle 10.

Figure 4:
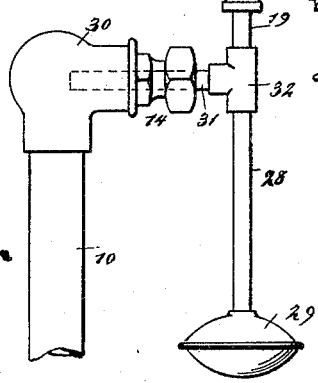

It will be understood that the device may be provided with any necessary number of nozzles, and in Fig. 4 I have shown it provided with one nozzle. Here the pipe 10 connects with an elbow 30 having a stuffing box 14 like those above described, and held to turn in this stuffing box is a pipe 31 which, at its outer end, connects with the T-coupling 32, to one end of which a weight rod 28, like that already described, is secured and the other end of which connects with a pipe 19, elbow 20, and nozzle 21, of the kind described above. The pipe 31 turns like the pipes 18, and the nozzle 21 on the single spraying device will always point upward, being swung to this position by the weight 29.

Having thus described my invention, I claim as new and desire to secure by Letters Patent—

1. A spraying device, comprising a hollow handle, a horizontal head or coupling in fixed relation to the handle and forming a water chamber complementary to the bore or chamber of the handle, a pipe rotatably held to the coupling and communicating with its interior, a substantially straight nozzle on said pipe, and a counterbalance arm on the pipe, such counterbalance arm being adapted to gravitate below the plane of the handle when the latter is raised and form a rest for permitting a tilting movement of the apparatus when desired, substantially as described.

2. A spraying apparatus, comprising a hollow handle, from which the following devices are supported and by which the apparatus is manipulated, to wit: a hollow head communicating with the bore or chamber of the handle, a pipe rotatably held to the head, communicating with the interior of the latter, and having an upward extension at its outer end, and a T connected with the upper end of such extension and having a spring-actuated valve the stem of which depends from the upright member of said T, substantially as described.

JOHN J. DUGAN.

Witnesses:
WM. F. DUGAN,
R. P. BOISE, Jr.